(12) United States Patent
Cardoso

(10) Patent No.: US 9,133,585 B2
(45) Date of Patent: Sep. 15, 2015

(54) SYSTEM OF SUPERSTRUCTURES AND SECTION PRESENTING SUCH SYSTEM OF SUPERSTRUCTURES

(76) Inventor: Paulo Alexandre Teixeira E. Silva Cardoso, Lisbon (PT)

( * ) Notice: Subject to any disclaimer, the term of this patent is extended or adjusted under 35 U.S.C. 154(b) by 0 days.

(21) Appl. No.: 13/991,147

(22) PCT Filed: Nov. 25, 2011

(86) PCT No.: PCT/PT2011/000041
§ 371 (c)(1),
(2), (4) Date: May 31, 2013

(87) PCT Pub. No.: WO2012/074423
PCT Pub. Date: Jun. 7, 2012

(65) Prior Publication Data
US 2013/0251451 A1 Sep. 26, 2013

(30) Foreign Application Priority Data
Dec. 1, 2010 (PT) .......................... 105414

(51) Int. Cl.
*E01C 1/00* (2006.01)
*H01L 31/042* (2014.01)

(52) U.S. Cl.
CPC ................ *E01C 1/002* (2013.01); *H02S 20/00* (2013.01); *Y02E 10/50* (2013.01)

(58) Field of Classification Search
CPC ............. F03G 7/08; E01C 1/00; E01C 1/002; Y02E 10/50; H02S 20/00
USPC ................... 404/1, 71; 290/1 R, 52
See application file for complete search history.

(56) References Cited

U.S. PATENT DOCUMENTS

| | | | | |
|---|---|---|---|---|
| 3,979,597 A | * | 9/1976 | Drucker | 290/55 |
| 4,321,476 A | * | 3/1982 | Buels | 290/55 |
| 5,118,361 A | * | 6/1992 | Fraas et al. | 136/246 |
| 5,228,924 A | * | 7/1993 | Barker et al. | 136/246 |
| 6,563,040 B2 | * | 5/2003 | Hayden et al. | 136/244 |
| 6,930,237 B2 | * | 8/2005 | Mattiuzzo | 136/251 |

(Continued)

FOREIGN PATENT DOCUMENTS

| | | | | |
|---|---|---|---|---|
| CA | WO2010094140 | * | 2/2010 | B60M 1/02 |
| DE | 3412584 A1 | | 10/1985 | |

(Continued)

OTHER PUBLICATIONS

Neville Mars, Solar Forest, Internet Citation, URL:http://replay.waybackmachine.org/20090925091608/http://burb.tv/view/Solar_forest, Aug. 7, 2009, pp. 1-2.

(Continued)

*Primary Examiner* — Raymond W Addie
(74) *Attorney, Agent, or Firm* — Fulwider Patton LLP (57) ABSTRACT

The present invention relates to a system of superstructures carrying renewable energy means along a section comprising, or in the proximity of a circulation area and addresses the goal of minimizing the visual impact resulting from such superstructures by means of a variation of at least some of the design parameters of said superstructures or of respective renewable energy means, preferentially at least as perceived by people circulating along said section. The present invention further relates to a section, for example of a traffic infrastructure, presenting such system of superstructures.

10 Claims, 4 Drawing Sheets

(56) References Cited

U.S. PATENT DOCUMENTS

| | | | |
|---|---|---|---|
| 7,098,553 B2* | 8/2006 | Wiegel et al. | 290/55 |
| 7,193,332 B2* | 3/2007 | Spinelli | 290/1 R |
| 7,381,886 B1* | 6/2008 | Aiken et al. | 136/246 |
| 8,336,539 B2* | 12/2012 | Linderman et al. | 126/696 |
| 8,544,221 B2* | 10/2013 | Marley | 52/173.3 |
| 8,875,450 B2* | 11/2014 | Conger | 52/146 |
| 2004/0246596 A1* | 12/2004 | Dyson et al. | 359/742 |
| 2005/0109384 A1* | 5/2005 | Shingleton et al. | 136/244 |
| 2006/0152008 A1* | 7/2006 | Ghassemi | 290/1 R |
| 2006/0210358 A1* | 9/2006 | Chen | 404/2 |
| 2007/0059097 A1* | 3/2007 | Chen | 404/71 |
| 2008/0087321 A1* | 4/2008 | Schwartzman | 136/246 |
| 2008/0150296 A1* | 6/2008 | Fein et al. | 290/1 R |
| 2008/0152492 A1* | 6/2008 | Fein et al. | 416/9 |
| 2009/0032090 A1* | 2/2009 | Kats et al. | 136/251 |
| 2009/0128085 A1* | 5/2009 | Yang | 320/101 |
| 2009/0195077 A1* | 8/2009 | Blumenthal | 307/72 |
| 2009/0200869 A1* | 8/2009 | Fein et al. | 307/69 |
| 2009/0229651 A1* | 9/2009 | Fay, Jr. | 136/246 |
| 2010/0000596 A1* | 1/2010 | Mackler | 136/246 |
| 2010/0089389 A1* | 4/2010 | Seery et al. | 126/608 |
| 2010/0183443 A1* | 7/2010 | Thorne | 416/146 R |
| 2010/0236608 A1* | 9/2010 | Ball et al. | 136/251 |
| 2011/0113705 A1* | 5/2011 | Raczkowski | 52/173.3 |

FOREIGN PATENT DOCUMENTS

| | | |
|---|---|---|
| DE | 4417065 A1 | 1/1995 |
| DE | 102007021438 A1 | 11/2008 |
| EP | 0802324 A1 | 10/1997 |
| WO | 2010055229 A1 | 5/2010 |
| WO | 2010/064942 A1 | 6/2010 |

OTHER PUBLICATIONS

PCT International Search Report, PCT/PT2011/000041, Jan. 12, 2010.

* cited by examiner

SYSTEM OF SUPERSTRUCTURES AND SECTION PRESENTING SUCH SYSTEM OF SUPERSTRUCTURES

CROSS-REFERENCES TO RELATED APPLICATIONS

This application claims priority from PCT/PT2011/000041, filed 25 Nov. 2011 incorporated by reference in its entirety.

FIELD OF THE INVENTION

The present invention relates to superstructures carrying renewable energy means and disposed along sections comprising or in the proximity of circulation areas. The present invention also relates to a section, such as of a traffic infrastructure, including a system of superstructures according to the invention.

PRIOR ART

There have been suggestions of installing renewable energy systems along roadways, some of which pointing to the use of elevated structures for such purpose. The DE 4417065 A1 and the DE 3412584 A1, for example, disclosed superstructures carrying solar energy means and general lighting and traffic surveillance means, along a road or highway. While in fact maximizing the total photovoltaic area per kilometer, both approaches present disadvantages in terms of how such structures and dispositions affect driving comfort and safety, and constrain integration into local surrounding (natural or urban) landscape. Both of these documents address the configuration of structures and point to a distribution of respective structures in similar formats and dimensions, in regular distances apart. None of these documents addresses the problem arising from similar constructions or distributions thereof.

The WO2010/0064942 first addresses the issues above and discloses sections of traffic infrastructures including certain distributions of superstructures and respective energy and information means in view of said comfort and security issues. This is achieved by distributions of successive superstructures of certain, eventually varying, lengths and distances in-between, preferentially predefined at least in view of local reference traffic conditions. However, this approach does not provide a solution for the particular cases of having successive superstructures disposed either directly adjacent or spaced by regular distances apart, along traffic ways. Moreover, given that in most cases it should result in a relatively course distribution of structures, such approach might often not represent a solution for meeting a relatively high linear density of local energy demand along such sections, as expressed in terms of both installed generation capacity (i.e., kW/km).

The present invention therefore builds upon the knowledge of the WO2010/0064942 and primarily addresses the problem that the overall construction resulting from superstructures installed has important impacts upon the comfort and security of people, in particular drivers, circulating along circulation ways. Such impacts are both in terms of direct security aspects, such as reductions of surrounding vision field, and of indirect aspects such as induced visual and mental fatigue, for example resulting from monotonous repetition' of substantially similar constructions and patterns along substantial extensions. Such impacts are also in terms of design integration of said superstructures into respective (natural or urban) surroundings—an aspect of increasing importance to the development of renewable energy.

SUMMARY OF THE INVENTION

The goal of the present invention is to provide a system of at least one, preferentially several superstructures, at least presenting renewable energy means, of at least one type, preferentially also information means, installed successively along the longitudinal direction of a section comprising at least one circulation area, in particular a traffic infrastructure, such that, even in the case of superstructures of relatively big lengths and/or of a relatively high density of superstructures, the resulting overall construction does not substantially constrain safety and comfort aspects, in particular of drivers circulating along such a section.

A related goal of the present invention is to provide a system of superstructures for a section comprising a circulation area of any extension, such that despite of construction aspects such as relatively high construction density, substantially regular distribution of superstructures and/or similar construction elements thereof, it is designed so that it also considers circulating comfort and security, as well as a flexible and least-intrusive integration of the resulting overall construction into local (natural or urban) surrounding landscape.

Hereinafter, "overall construction" is to be understood as the set of visible elements in a system of superstructures arranged in a given spatial distribution, including along a given extension, having an impact upon the resulting overall visual perception, preferentially at least as perceived by people circulating along or being next to such a system of superstructures, and basically resulting from a respective structural construction and envelope construction.

The term "structural construction" refers to the set of design parameters of construction elements of similar function such as structural elements of the superstructures and so-called energy envelopes defined by energy generation means, including their relative spatial position and orientation at least relative to a pavement level and/or vertical projection of a proximal circulation area at each location along a respective longitudinal direction, and their formats, dimensions and materials, as well as any patterns resulting thereof.

The term "envelope construction" refers to the set of design parameters of renewable energy means disposed in a respective energy envelope, including their relative spatial position and orientation at least in relation to a pavement level and/or vertical projection of a proximal circulation area at each location along a respective longitudinal direction, and their formats, dimensions and materials, as well as any patterns resulting thereof.

The aforementioned goals of the invention are attained by means of a system of superstructures comprising at least one, preferentially a plurality of superstructures presenting renewable energy means and installed along a longitudinal direction of a section, such that the overall construction of said superstructures varies preferentially at least along a longitudinal direction thereof, more preferentially at least as perceived by people moving along a circulation direction. In particular, the overall construction of said superstructures is designed to vary in substantially intentional or conscious relative disposition of structural elements and renewable energy means, including as reflection of certain local aspects, rather than in a substantially casual or random relative disposition, at least as perceived by people walking and/or circulating in its proximity or along it. It is preferred according to the invention that the variation of the general construction results from a variation of a reduced number of constructive parameters thereof, more preferentially a variation in a relative reduced proportion of such construction parameters, at least as perceived by people moving along a circulation direction, and in time.

According to a preferred embodiment, the overall construction of said superstructures varies as a result of varying at least the structural construction of said superstructures, including as resulting at least from respective structural elements or from respective energy envelopes, or the envelope construction of said energy envelopes, including as resulting at least from said renewable energy means, in at least one, preferentially several superstructures, in relation to any other in said section, preferentially at least along a longitudinal direction thereof. According to another preferred embodiment, at least the structural construction or at least the envelope construction, varies within one superstructure, or in at least one superstructure in relation to at least a next superstructure, at least along a longitudinal direction of said section. It is preferred that the variation of the overall construction of the system of superstructures extends over at least part, preferentially at least most part of the longitudinal extension of said section.

The system of superstructures according to the invention thus presents an overall construction at least corresponding to varying distributions of, and/or at least different structural constructions or envelope constructions of said superstructures, at least along said longitudinal direction of a section.

According to another aspect, the structural construction of said superstructures may vary at least as a result of different relative positions or spatial orientations, at least of respective structural elements or of respective energy envelopes, at least in relation to a next structural element or energy envelope respectively, and/or in relation to the circulation area of said section. Furthermore, the structural construction of said superstructures may also vary as a result at least of different formats, or dimensions, or construction materials, at least of respective structural elements or of respective energy envelopes.

This means that, even in the case of a single, very long superstructure, presenting substantially similar renewable energy means arranged in a substantially similar disposition, at least some structural elements and/or energy envelope may vary in such a way that the overall construction of the system varies preferentially at least along a circulation direction.

According to another aspect, the envelope construction of said energy envelopes may vary at least as a result of different relative positions or spatial orientations of said renewable energy means, at least in relation to a respective energy envelope or to a neighboring renewable energy means. Moreover, it is preferred that the envelope construction of said energy envelopes may also vary as a result at least of different formats, or dimensions, or materials, of said renewable energy means. According to another aspect, the renewable energy means preferentially present one format and at least two respective sizes, or several formats, each presenting at least one, preferentially several respective sizes, preferentially defined in such a way that they may be disposed directly adjacent to each other thereby forming a substantially continuous envelope area. Moreover, said renewable energy means are preferentially disposed individually, or in groups thereof, at a distance from neighboring renewable energy means or groups thereof, within respective energy envelopes, at least as a function of local geographic orientation and dimensions of the circulation area.

This means that successive superstructures may be disposed in substantially regular distributions and present substantially similar structural construction, but present such differently arranged and/or different renewable energy means that a respective envelope construction varies, preferentially at least along a circulation direction.

According to another aspect, the variation of the overall construction of said superstructures is preferentially defined so as to reflect at least the local variation of reference aspects along the longitudinal direction of said section, including type of surroundings, terrain topography, construction characteristics and dimensions of circulation area, visibility conditions, or at least of reference aspects of circulation flow, including traffic typology and distribution, recommended circulation speed, or at least other traffic related aspects including presence of traffic support facilities. Furthermore, it is preferred that each superstructure presents at least one set of structural elements disposed successively at a circulation level and/or an elevated level, and at least the relative position, or the spatial orientation, at least in relation to a proximal circulation area or to a next superstructure, or at least the format, or dimensions, or materials of said structural elements are defined with advantage as a function of factors including the vision field resulting at the circulation level, and the local inclination and curvature of the circulation area, preferentially at least as perceived by people circulating there along. Furthermore, it is preferred that each superstructure presents at least one energy envelope disposed in at least one elevated level, and at least the relative position or the spatial orientation, at least in relation to a proximal circulation area or to a next energy envelope, or at least the format, or dimensions, or materials, of said energy envelope are defined with advantage as a function of factors including the local solar and wind orientations, and/or the resulting areas of direct light incident upon the circulation level of the circulation area, including respective size, relative orientation, light intensity and light glare. Furthermore, it is preferred that each superstructure presents at least one renewable energy means disposed within and/or defining a respective energy envelope, and at least the relative position, or spatial orientation, at least in relation to a proximal circulation area or to a next renewable energy means, or at least the format, or dimensions, or materials of said renewable energy means are defined with advantage as a function of factors including the areas of light incident upon the circulation level including respective size, relative orientation, light intensity and light glare, and the areas of shade projected upon the circulation level of a circulation area, including respective size, tonality, pattern extension, variation frequency.

According to another aspect, the overall construction of said superstructures follows a substantially continuous variation, preferentially at least as perceived by people circulating along said circulation area. Moreover, the overall construction of successive superstructures preferentially forms a pattern, or a sequence of patterns, preferentially at least as perceived by people circulating along said circulation area, thereby preferentially conveying to said people at least the evolution of general circulation aspects along said circulation area. Moreover, at least the structural construction or at least the envelope construction is different in each circulation direction and/or varies in a different way in each circulation direction along said circulation area. This allows to better customize the overall construction to respective local variations.

All of the aforementioned aspects are applicable to systems of superstructures presenting energy envelopes at least visible from, or in the proximity, or projecting at least partially above a circulation area, and to systems of superstructures disposed at a regular or variable distance apart, preferentially at a reduced distance apart relative to their respective length, more preferentially directly adjacent, along a circulation direction of a proximal circulation area.

The present invention further discloses a section comprising at least one system of superstructures according to any of the aforementioned aspects, whereby said section corresponds to a given spatial extension comprising or in the proximity of a circulation area, in particular of a traffic infrastructure, or another area of public or private use.

According to a preferred aspect, such section comprises at least one system disposed along at least one of the circulation directions. Moreover, it is preferred when a next section presents a different system from the one in a previous section. According to another aspect, when said-section corresponds to a section of a traffic infrastructure, then it is preferred that said superstructures are disposed at least along the sideways and/or the area dividing circulation directions, or at least partially above of the circulation area.

Besides of the reference application to sections of traffic ways, the system of superstructures according to the invention is also applicable to sections of other spaces, including other areas of public use, such as public parks, and other superstructures, including buildings.

The present invention shall be explained in more detail by reference to several preferred embodiments thereof, schematically represented in the drawings.

DETAILED DESCRIPTION OF EMBODIMENTS OF THE INVENTION

Figure 1A:
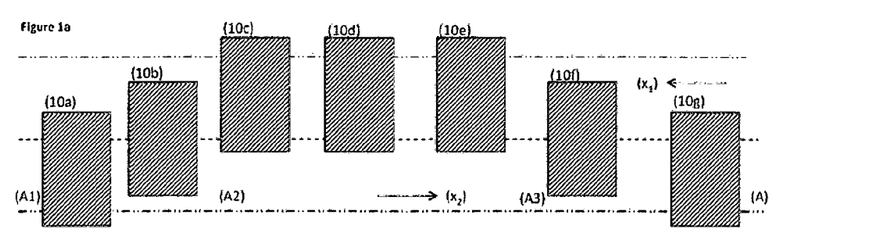
FIGS. 1a-1c: are schematic representations of a first set of embodiments of structural constructions of a system according to the invention.
Figure 1B:
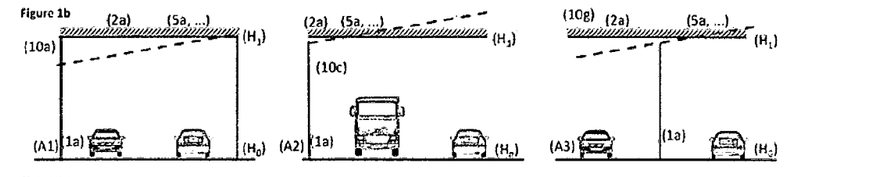
Figure 1C:
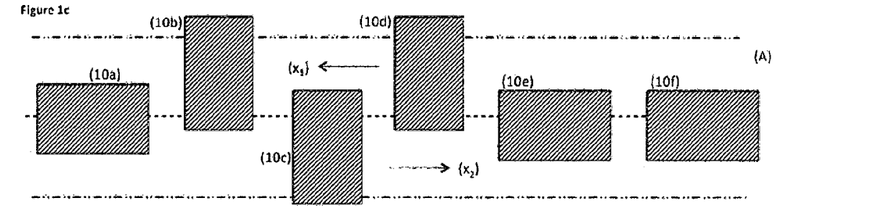

FIGS. 1a to 1c represent individual superstructures (10a, . . . ), in the particular case of being disposed at substantially similar distances apart, comprising structural elements (1a, . . . ) presenting energy envelopes (2a, . . . ) formed by a disposition of renewable energy means, such-as for example solar energy means (5a, . . . ), in a section (A) in the proximity of a circulation area, such as for example a traffic infrastructure. FIGS. 1a to 1c are schematic examples of a system of said superstructures (10a, . . . ) according to the invention, whereby a variable overall construction along a circulation direction results primarily from a different relative position and/or spatial orientation of the structural construction, in particular of the structural elements (1a, . . . ) of respective superstructures (10a, . . . ) in relation to a next superstructure (10b, . . . ) and/or to a proximal circulation area.

FIG. 1a is a plane view of a first embodiment according to the invention, whereby a plurality of superstructures (10a, . . . ) is disposed at a substantially regular distance apart and presents substantially similar energy envelopes (2a, . . . ), but different relative positions in relation to the circulation area, eventually leading to different structural constructions as further depicted by FIG. 1b in respective front views for three different locations ($A_x$, A2, A3) along the circulation direction of section (A). In the drawing on the left (corresponding to location Ai on FIG. 1a), structural elements (1a) in superstructure (10a) present a relative position in which they are disposed, for example, along both sideways and are spatially organized in such a way that it results in a substantially portico-like structural form. In the one at the middle (corresponding to location A2), structural elements (1a) of superstructure (10c) are disposed, for example, along an East facing sideway and spatially organized so as to produce an "inverted L"-like structural form. In the one at the right (location A3), the structural elements (1a) of superstructure (10f) are disposed, for example, along a dividing area of the circulation directions, and are spatially organized in a substantially "T-like" structural form. Thus, in a system according to the invention, there could be a plurality of superstructures (10a, . . . ) presenting different structural forms while sharing other construction design parameters (including form, dimensions, materials).

As an additional possibility, in a system according to the invention, the structural construction could also be varied by means of varying the spatial orientation of structural elements (1a) directly associated with the, at least one, energy envelope (2a) of at least one superstructure (10a, . . . ), in relation to a next superstructure (10b, . . . ) and/or to a proximal circulation area, as schematically indicated by the dashed lines in FIG. 1b. FIG. 1c illustrates another embodiment of a system according to the invention whereby the structural elements (1a, . . . ) of superstructures (10a, . . . ) are disposed in different relative spatial orientations relative to a next superstructure and/or to a proximal circulation area of section (A) so that respective energy envelopes (2a, . . . ) present different orientations too.

In all the cases illustrated in these Figures, structural elements (1a, . . . ) and energy envelopes (2a, . . . ) may present a substantially similar form, dimensions or materials, i.e. a substantially similar construction design; overall construction of the system changes by varying at least the relative spatial position or the form of the structural construction of at least one, preferentially several superstructures (10a, . . . ), at least along a circulation direction of a section (A).

Figure 2A:
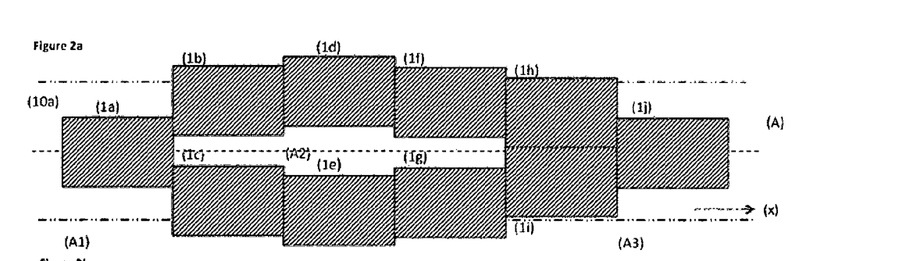
FIGS. 2a-2c: are schematic representations of a second set of embodiments of structural constructions of a system according to the invention.
Figure 2B:
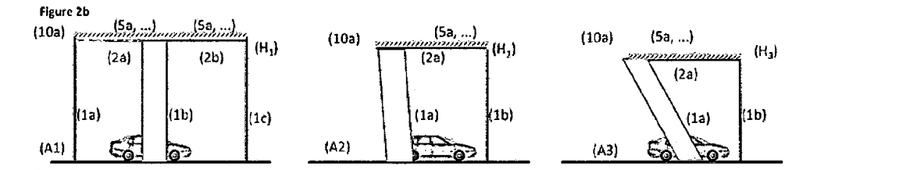
Figure 2C:
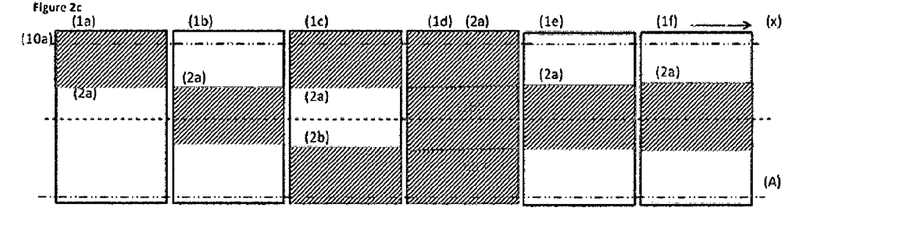

FIGS. 2a to 2c represent a second set of embodiments of a system according to the invention, in the particular case of a relative long superstructure (10a), whereby at least one of, preferentially several of, respective structural elements (1a, . . . ), besides of eventually varying their respective relative position and/or spatial orientation, at least in relation to a proximal circulation area and/or to a next structural element (1b, . . . ), also vary at least their respective form, dimensions, or materials, at least in relation to a next structural element (1b, . . . ), or superstructure (10b, . . . ), while thereby further presenting substantially similar energy envelopes (2a, . . . ).

FIG. 2a represents a plan view of a special case of a system comprising one superstructure (10a) including several structural elements (1a, . . . ) disposed successively along a longitudinal direction, thereby varying respective relative spatial positions in relation to the circulation area, for example some along the sideways and others along the central dividing area. These structural elements (1a, . . . ) are disposed in a clustered arrangement, i.e. in substantial proximity of an adjacent one, but with different relative spatial positions in relation to the circulation area and thus leading to the overall construction of superstructure (10a) to vary at least along a respective traffic flow direction (x). As depicted by structural elements (Id, 1e), energy envelopes (2a) may also extend beyond the vertical projection of the circulation area.

FIG. 2b depicts three side views of structural elements (1a, . . . ) at three successive locations of one superstructure (10a), whereby each thereby presents different form and dimensions (for example, the relative inclination of structural side elements—as illustrated). Moreover, these structural elements (1a, . . . ) may present a different height along the circulation direction, so that respective solar energy means (5a, . . . ) are disposed at different heights (Hi, ¾, H3, respectively) relative to the pavement level (Ho) of a proximal circulation area. It is advantageous to predefine the format of said structural elements (1a, . . . ) to convey a particular variation in traffic circulation conditions, for example proximity of a curve or reduction of advisable circulation speed along a respective extension, or to benefit the conditions of renewable energy generation, for example better solar exposition according to location geographic orientation of the circulation direction.

FIG. 2c is a plan view of another system comprising one superstructure (10a), whereby all respective structural elements (1a, . . . ) are disposed in similar relative spatial positions, for example along the sideways of a proximal circulation area. In this case, structural elements (1a, . . . ) form a similar rectangular format containing at least one respective energy envelope (2a, . . . ), the difference being the relative location and number of said energy envelopes (2a, . . . ) in relation to said structural elements (1a, . . . ). Substantially similar structural elements (1b, 1c, Id) present, as illustrative example, an increasing number of substantially similar energy envelopes (2a, . . . ) resulting in a variation of the overall construction, preferentially at least as perceived by people circulating along the circulation area.

FIGS. 3a to 3e illustrate a third set of embodiments of a system according to the invention, whereby the structural construction of at least one, preferentially several superstructures (10a, . . . ) varies as a result of varying at least the spatial orientation of at least one respective structural element (1a, . . . ), or its form, or dimensions, or materials, at least relative to a next superstructure (10b, . . . ), or structural element (1b, . . . ), preferentially at least along a circulation direction (x). In this embodiment, it is further presented the case of disposing successive superstructures (10a, . . . ) at variable distances apart along a circulation direction (x). For simplicity of representation, superstructures (10a) in these examples present only one energy envelope (2a) with at least one renewable energy (5a, . . . ) means, represented by the dashed areas, so that one abdicates from individually referencing these.

Figure 3A:
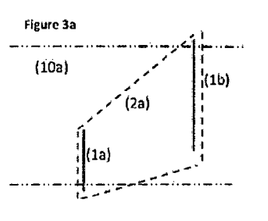
FIGS. 3a-3e: are schematic representations of a third set of embodiments of structural constructions of a system according to the invention.
Figure 3B:
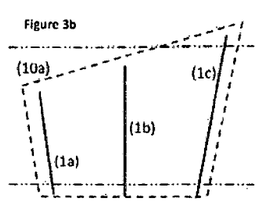
Figure 3C:
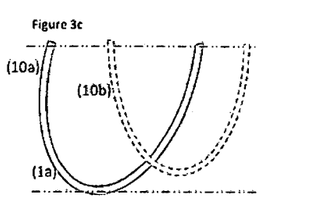

FIGS. 3a to 3c are plane views of superstructures (10a, . . . ) presenting structural elements (1a, . . . ) at different spatial orientations relative to the circulation area, and eventually also relative a next structural element (1b, . . . ) and/or superstructure (10b, . . . ). In FIG. 3a, successive structural elements (1a, 1b) are disposed in opposition across the circulation area and present different dimensions, including respective spans over the circulation area, thereby leading to best supporting a given trapezoidal format of a respective energy envelope (2a). In FIG. 3b, structural elements (1a, 1b, 1c) are disposed in the same sideway at a similar distance apart, but in a variable spatial orientation in relation to the circulation area, again leading to a trapezoidal format of a respective energy envelope (2a). FIG. 1c illustrates two successive superstructures (10a, 10b) basically made from one respective structural element (1a) with a similar format (in this case, arch-like) and different configurations thereof. In all these embodiments, these structural elements may then further vary in other superstructures (10b, . . . ) within a section (A), with advantage both in terms of better orientation of the energy envelope (2a, . . . ) in view of renewable energy generation, and/or in terms of conveying a given variation of reference circulation aspects to drivers.

Figure 3D:
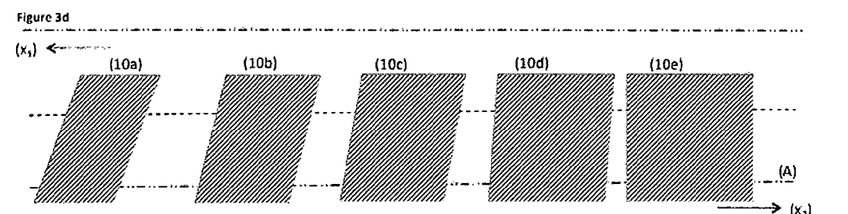
Figure 3E:
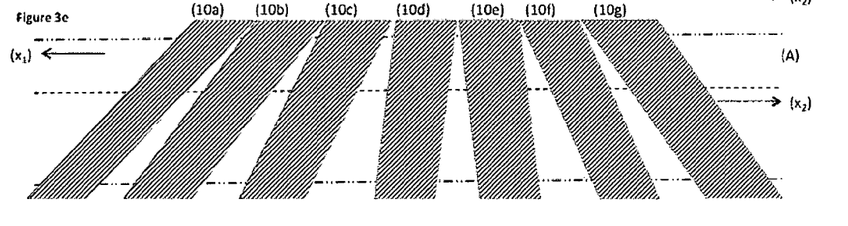

FIGS. 3d and 3e are plan views of two embodiments whereby a cluster of superstructures (10a, . . . ) is disposed so that they convey, for example, a decrease of recommended circulation speed along one (x2) of the circulation directions (FIG. 3d), and the presence of a curve (FIG. 3e). In both cases, energy envelopes (2a, . . . ) of each superstructure (10a, . . . ) might thereby have a substantially similar format and dimensions, but a different spatial orientation, including different inclination including relative to the pavement plane, and/or a different relative position or distances apart, in relation to the circulation area, including as a result of different structural elements (1a, . . . ) and at least along a circulation direction (x) thereof.

FIGS. 4a to 4f represent plan views of sections (A) comprising a fourth set of embodiments of a system according to the invention, whereby the structural construction of respective superstructures (10a, . . . ) varies mostly as a result of varying at least the forms, or dimensions, or materials of energy envelopes (2a, . . . ), eventually also varying at least their respective relative position, or spatial orientation, at least in relation to the circulation area or to a neighboring energy envelope (2b, . . . ), preferentially at least along a circulation direction (x).

Figure 4A:
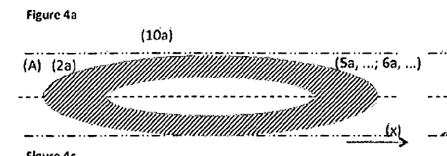
FIGS. 4a-4f: are schematic representations of a first set of embodiments of envelope constructions of a system according to the invention.
Figure 4B:
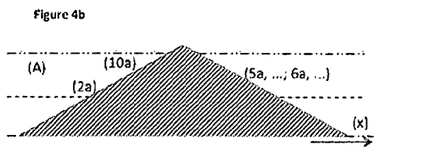

In FIGS. 4a and 4b there is represented the particular case of only one superstructure (10a) extending over most of the entire length of a section (A), whereby a respective energy envelope (2a) is suspended and/or tensioned at least partially above of the circulation area, while thereby presenting one renewable energy means (5a), or one substantially continuous area of renewable energy means (5a, . . . ). In both cases, there would be no structural elements (1a, . . . ) of relevant visual impact, at least as perceived by drivers, and the format of the energy envelope (2a) is represented as that substantially occupied by respective, at least one, preferentially several, renewable energy means (5a, 6a, . . . ). According to the invention, the format of this energy envelope (2a) is pre-defined such that it varies substantially at least along the traffic flow direction (x). In particular, the format of the energy envelope (2a) is pre-defined as substantially circular in the case of FIG. 4a and triangular in the case of FIG. 4b, and disposed so as to vary the resulting projection over the circulation area, at least as perceived by people circulating along a respective circulation direction (x). Other formats are naturally feasible as such particular embodiments according to the present invention.

Figure 4C:
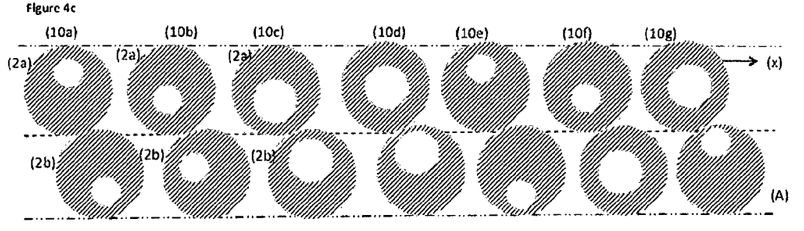
Figure 4D:
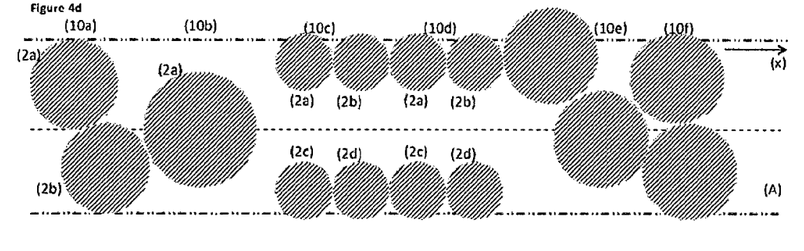

FIGS. 4c and 4d represent energy envelopes of substantially similar format, but varying relative disposition, configuration and/or dimensions. In FIG. 4c there are circular energy envelopes with an opening that is disposed in a variable relative position within a respective energy envelope (2a). In FIG. 4d there are energy envelopes (2a, . . . ) in different relative dispositions, including clusters thereof disposed in linear series and in transversal groups.

Figure 4E:
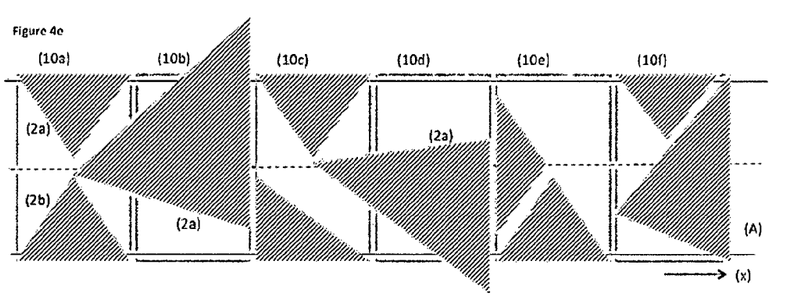
Figure 4F:
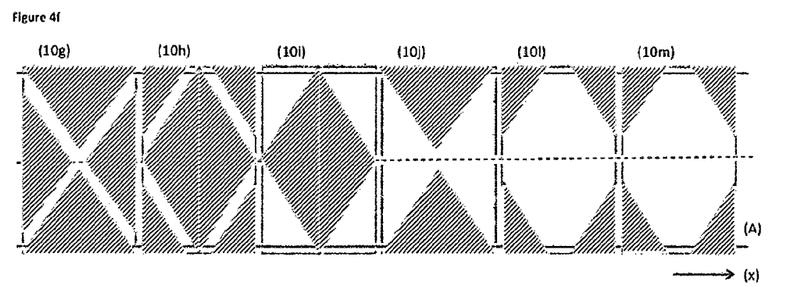

FIGS. 4e and 4f also present energy envelopes (2a, . . . ) of substantially similar format, in this case triangular. In FIG. 4e there is a system of superstructures (10a, . . . ) presenting substantially similar structural elements (1a, . . . ) disposed at similar relative positions and spatial orientations, whereby respective energy envelopes (2a, . . . ) are arranged in different spatial orientations and provided in different dimensions. In this embodiment, energy envelopes may extend over more than one superstructure and/or beyond the vertical projection of a proximal circulation area, as for example in the case of that in the second and fourth superstructures (10b, 10d). As in other embodiments, the form and dimension of energy envelopes (2a, ...) may be used to convey particular reference circulation aspects: for example the approximation of a curve by the energy envelope of the second superstructure (10b) in FIG. 4e. FIG. 4f illustrates the possibility of disposing energy envelopes (2a, ...) in such a way that it results in several possibilities of different joint formats, at least as perceived by drivers circulating along a section (A). As in other embodiments, the pattern resulting from the overall construction, including from respective construction envelopes of superstructures (10a, ...) may also be predefined so as to communicate or represent a given reference circulation aspect: for example, conveying an increasing recommended circulation speed along decreasing energy envelopes over the circulation area in FIG. 4f.

FIGS. 5a to 5d represent plan views of a fifth set of embodiments in which the overall construction of a system according to the invention is varied by means of varying the envelope construction of at least one, preferentially several superstructures (10a, ...), at least along a circulation direction (x). In the case of embodiments represented in FIGS. 5a and 5b, this is achieved by varying the relative position and/or spatial orientation of respective renewable energy means (5a, 6a, ...), including in relation to a respective energy envelope (2a, ...) and/or to neighboring renewable energy means (5b, 6b, ...), and preferentially at least as perceived by people circulating along it. Complimentarily or alternatively, one considers varying at least the form, or dimensions or materials of said renewable energy means (5a, ...; 6a, ...), at least along a circulation direction (x), as illustrated in embodiments shown in FIGS. 5c and 5d. For the purpose of the present disclosure, one considers solar energy means (5a, ...) and wind energy means (6a, ...). The expert will understand that many other types of renewable energy means and embodiments of respective distributions and configurations are within the scope of the present invention besides of the presented in these examples.

Figure 5A:
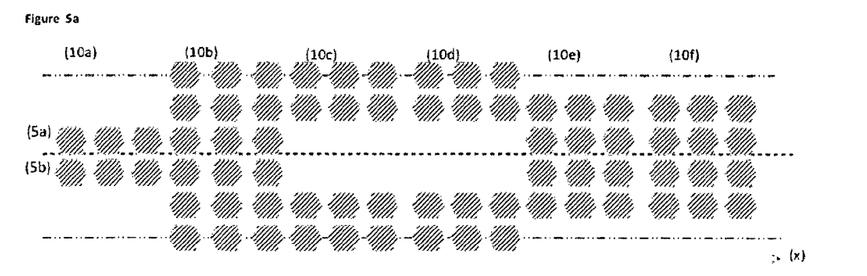
FIGS. 5a-5d: are schematic representations of a second set of embodiments of envelope constructions of a system according to the invention.
Figure 5B:
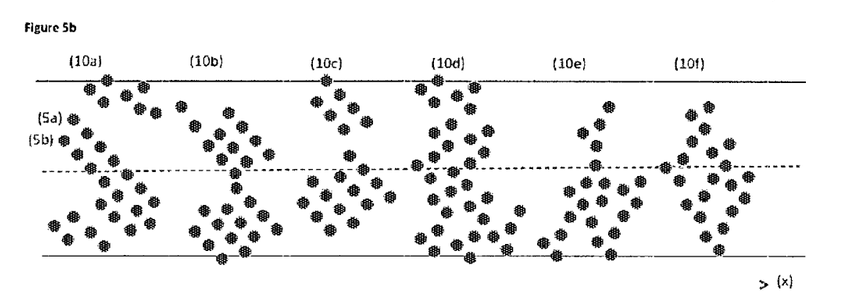

Thus, in FIG. 5a, there is a substantially regular distribution pattern of renewable energy means (5a, ...) of substantially similar format, dimensions and materials, but in varying relative positions along a circulation direction (x), whereas in the case of FIG. 5b, the distribution follows a substantially irregular pattern. As it should be readily derivable by an expert in the field, other possibilities of embodiments according to the invention might include renewable energy means (5a, ...) disposed in different spatial orientation, at least along a circulation direction (x)—somewhat similarly to the case of energy envelopes (2a, ...) depicted in FIG. 4e.

Figure 5C:
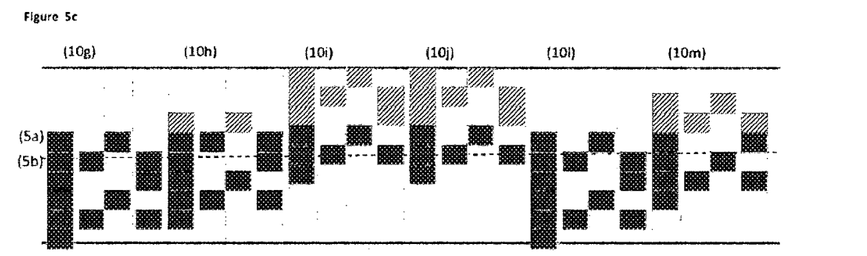
Figure 5D:
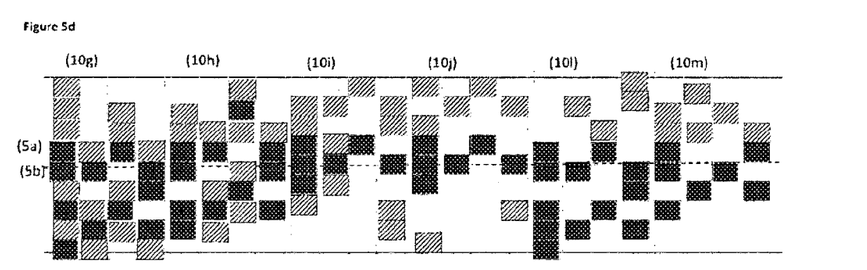

FIGS. 5c and 5d represent examples of renewable energy means (5a, ...) of different materials (as illustrated by respectively lighter and darker patterns), in particular of different light transmission properties, thus resulting in a variation of light and shadows being projected by each, including as perceived by people circulating along a circulation direction.

A preferred alternative would be the use of materials associated with said renewable energy means (5a, ...), for example as a wide area flexible element, disposed in their proximity on the side facing the circulation area, and presenting a given configuration pattern resulting in a variation at least of the light and shades being projected by said renewable energy means (5a, ...), at least as perceived by people circulating along a circulation direction (xi, x2).

As it should be easily understood by an expert in the field, other possibilities would include renewable energy means (5a, ...) of variable formats and/or dimensions at least along a circulation direction (x)—somewhat similarly to the case of energy envelopes (2a, ...) depicted in FIG. 4.

I claim:

1. A solar energy collecting system, comprising:
   a plurality of superstructures along a transportation path, each superstructure including at least one pole supporting a canopy structure, and at least one energy envelope presenting at least one solar collector; and
   at least one superstructure varying along the transportation path with respect to a number of the energy envelopes as compared with a number of energy envelopes on a neighboring superstructure, such that a visual perception of the at least one superstructure varies traveling along the transportation path as compared with a visual perception of the neighboring superstructure.

2. The solar energy collecting system of claim 1, wherein a change in the visual perception of adjacent superstructures serves to convey a variation in traffic circulation conditions along the transportation path.

3. A solar energy collecting system, comprising:
   a plurality of superstructures along a transportation path, each superstructure including at least one pole supporting a canopy structure, and at least one an energy envelope presenting at least one solar collector; and
   at least one superstructure varying along the transportation path with respect to a shape of the energy envelope as compared with a shape of a neighboring energy envelope along the transportation path, such that a visual perception of the at least one superstructure varies traveling along the transportation path as compared with a visual perception of the neighboring superstructure, and wherein the varying of the shape of the energy envelope is independent of a shape of the at least one solar collector.

4. The solar energy collecting system of claim 3, wherein a change in the visual perception of adjacent superstructures serves to convey a variation in traffic circulation conditions along the transportation path.

5. A solar energy collecting system, comprising:
   a plurality of superstructures along a transportation path, each superstructure including at least one pole supporting a canopy structure, and at least one an energy envelope presenting a plurality of solar collectors; and
   at least one of said superstructures varying along the transportation path with respect to a density of solar collectors on its energy envelope as compared with a density of solar collectors on a neighboring energy envelope along the transportation path, such that a visual perception of the at least one superstructure varies traveling along the transportation path as compared with a visual perception of the neighboring superstructure, and wherein said varying of the density of the solar collectors on the energy envelope is related to a varying of a spacing in between solar collectors.

6. The solar energy collecting system of claim 5, wherein a change in the visual perception of adjacent superstructures serves to convey a variation in traffic circulation conditions along the transportation path.

7. A solar energy collecting system, comprising:
   a plurality of superstructures along a transportation path, each superstructure including at least one pole supporting a canopy structure, and an energy envelope presenting at least one solar collector; and
   at least one superstructure having an arrangement of solar collectors that varies as compared with an arrangement of solar collectors on a neighboring energy envelope along the transportation path.

8. The solar energy collecting system of claim 7, wherein a change in the visual perception of adjacent superstructures serves to convey a variation in traffic circulation conditions along the transportation path.

9. A solar energy collecting system, comprising:
- a plurality of superstructures along a transportation path, each superstructure including at least one pole supporting a canopy structure, and an energy envelope presenting at least one solar collector; and
- at least one superstructure along the transportation path has an energy envelope with a light transmission that that varies as compared with an energy envelope's light transmission on a neighboring energy envelope along the transportation path.

10. The solar energy collecting system of claim 9, wherein a change in the visual perception of adjacent superstructures serves to convey a variation in traffic circulation conditions along the transportation path.

\* \* \* \* \*